US009685091B2

(12) United States Patent
Hayes

(10) Patent No.: US 9,685,091 B2
(45) Date of Patent: Jun. 20, 2017

(54) AERIAL VEHICLE AWARENESS DISPLAY

(71) Applicant: Insitu, Inc., Bingen, WA (US)

(72) Inventor: Andrew Royds Hayes, White Salmon, WA (US)

(73) Assignee: Insitu, Inc., Bingen, WA (US)

( * ) Notice: Subject to any disclaimer, the term of this patent is extended or adjusted under 35 U.S.C. 154(b) by 388 days.

(21) Appl. No.: 14/453,492

(22) Filed: Aug. 6, 2014

(65) Prior Publication Data

US 2016/0364991 A1 Dec. 15, 2016

Related U.S. Application Data

(60) Provisional application No. 61/872,215, filed on Aug. 30, 2013.

(51) Int. Cl.
*G08G 5/00* (2006.01)
*B64C 39/02* (2006.01)

(52) U.S. Cl.
CPC ......... *G08G 5/0086* (2013.01); *G08G 5/0026* (2013.01); *G08G 5/0069* (2013.01); *B64C 2201/146* (2013.01)

(58) Field of Classification Search
CPC ............. G08G 5/0086; G08G 5/0069; B64C 2201/146
See application file for complete search history.

(56) References Cited

U.S. PATENT DOCUMENTS

| 5,936,552 A * | 8/1999 | Wichgers ............... G01C 23/00 340/961 |
| 7,098,809 B2 | 8/2006 | Feyereisen et al. |
| 7,327,285 B2 | 2/2008 | McCauley et al. |

(Continued)

FOREIGN PATENT DOCUMENTS

| EP | 2372670 A1 | 10/2011 |
| GB | 2479252 A | 10/2011 |

(Continued)

OTHER PUBLICATIONS

International Patent Application No. PCT/US2014/052571; Int'l Search Report and the Written Opinion; dated Nov. 19, 2014; 11 pages.

(Continued)

*Primary Examiner* — Michael J Zanelli
(74) *Attorney, Agent, or Firm* — Baker & Hostetler LLP

(57) ABSTRACT

A method of displaying information pertaining to an air vehicle is disclosed. Information is displayed indicative of first portions of a map where distance between a current altitude of the air vehicle and terrain in the map are within a first threshold. Information is displayed indicative of second portions of a map where a distance between the current altitude of the air vehicle and terrain in the map are within a second threshold. The first and second portions are updated based on a change in the current altitude of the air vehicle. In another example, a map including a projected flight path of an aircraft is displayed. Location-based information pertaining to radio frequency (RF) status between the aircraft and at least one ground radio is displayed on the map. The location-based information pertaining to RF status is updated based on a change in the current position of the air vehicle.

17 Claims, 7 Drawing Sheets

(56) References Cited

U.S. PATENT DOCUMENTS

| | | | |
|---|---|---|---|
| 8,018,376 B2 | 9/2011 | McClure et al. | |
| 8,160,757 B1 * | 4/2012 | Frank | G01C 23/00 701/11 |
| 2006/0046715 A1 | 3/2006 | Burgemeister | |

FOREIGN PATENT DOCUMENTS

| | | |
|---|---|---|
| WO | WO 2009/139937 A2 | 11/2009 |
| WO | WO 2013/163746 A1 | 11/2013 |

OTHER PUBLICATIONS

International Patent Application No. PCT/US2014/052701; Int'l Search Report and the Written Opinion; dated Nov. 24, 2014; 13 pages.

International Patent Application No. PCT/US2014/052701; Int'l Preliminary Report on Patentability and Written Opinion; dated Mar. 10, 2016; 9 pages.

International Patent Application No. PCT/US2014/052571; Int'l Preliminary Report on Patentability and Written Opinion; dated Mar. 10, 2016; 9 pages.

* cited by examiner

AERIAL VEHICLE AWARENESS DISPLAY

CROSS REFERENCE TO RELATED APPLICATIONS

This application claims benefit under 35 U.S.C. §119(e) of U.S. Provisional Patent Application No. 61/872,215, filed Aug. 30, 2013, the contents of which are incorporated herein by reference in their entireties.

BACKGROUND

The present application is generally related to displaying terrain along projected flight paths of aerial vehicles.

The use of unmanned aerial vehicles (UAVs) has increased in recent years. UAVs are used for many applications by entities such as the military, law enforcement, and the like, and by individuals, such as UAV enthusiasts. Unlike pilots of manned aircraft, UAVs are unmanned and the controllers of the UAVs are not located inside of the aircraft that is being controlled. Controller inputs can be transmitted to UAVs in flight to control the flight path of the UAV via ground based systems. The flight path of the UAV may be tracked via the ground based systems, and the UAV may transmit data back to the controller. However, a controller on the ground may not have the same situational awareness about the UAV and its surroundings as a pilot situated in an aircraft. Controllers of UAVs may benefit from information presented in a way that gives them greater awareness of the UAV and its surroundings.

SUMMARY

Illustrative examples of the present disclosure include, without limitation, methods, structures, and systems. In one aspect, a method of displaying information about an air vehicle can include displaying information indicative of first portions of a map where a distance between a current altitude of the air vehicle and terrain in the map are within a first threshold, displaying information indicative of second portions of a map where a distance between the current altitude of the air vehicle and terrain in the map are within a second threshold, and updating the first and second portions based on a change in the current altitude of the air vehicle.

Other features of the methods, structures, and systems are described below. The features, functions, and advantages can be achieved independently in various examples or may be combined in yet other examples, further details of which can be seen with reference to the following description and drawings.

BRIEF DESCRIPTION OF DRAWINGS

Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
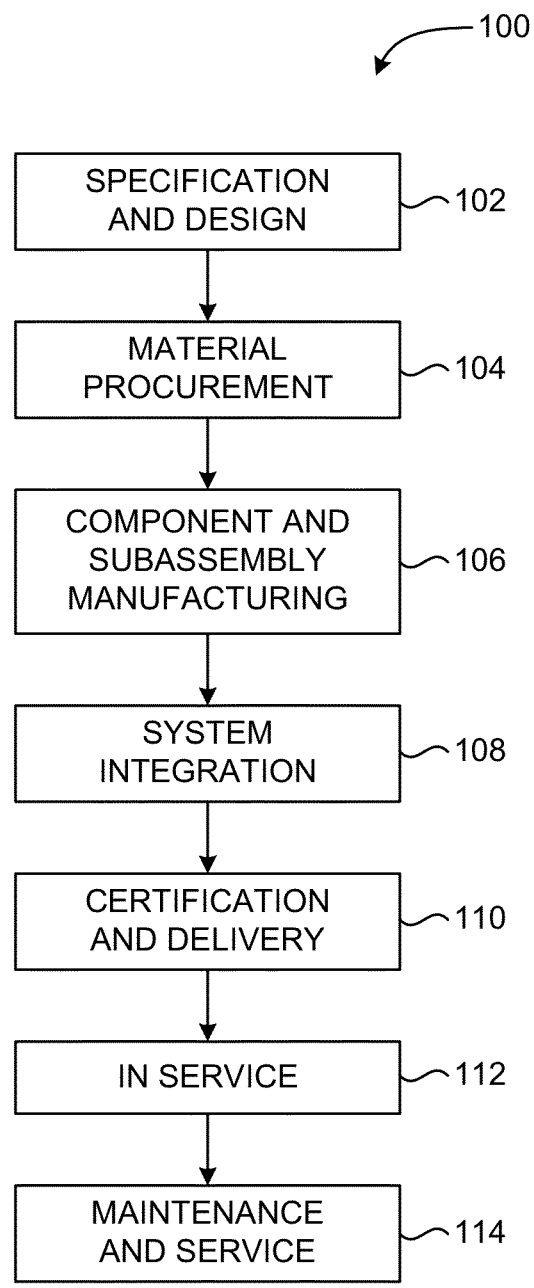
FIG. 1 depicts a flow diagram of an aircraft production and service methodology.
Figure 2:
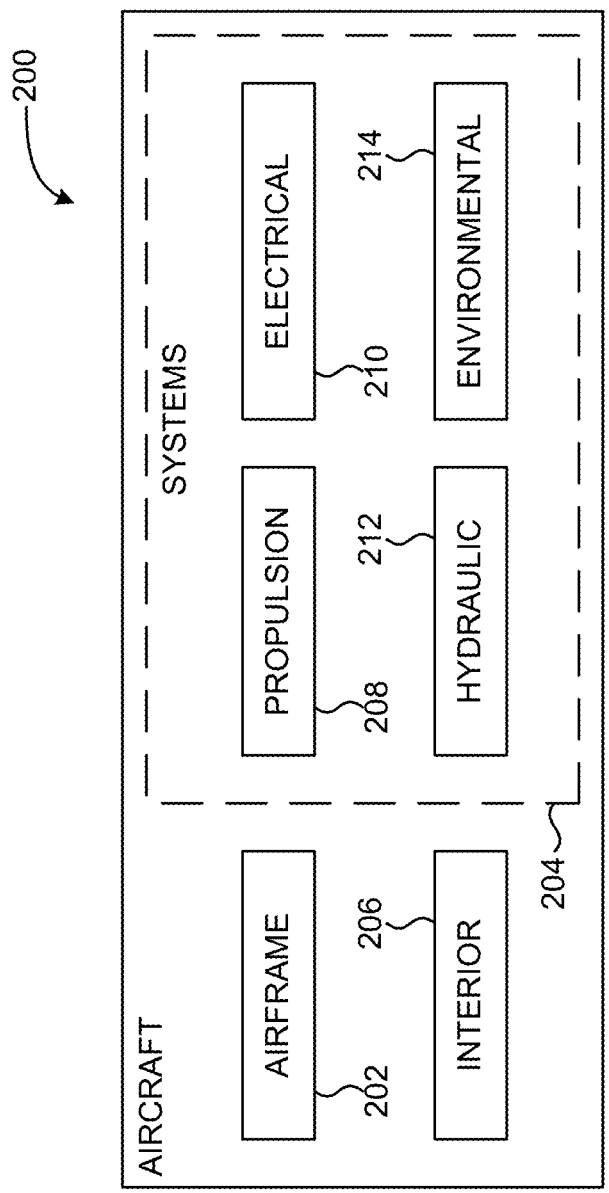
FIG. 2 depicts a block diagram of an aircraft.

Examples in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Figure 3:
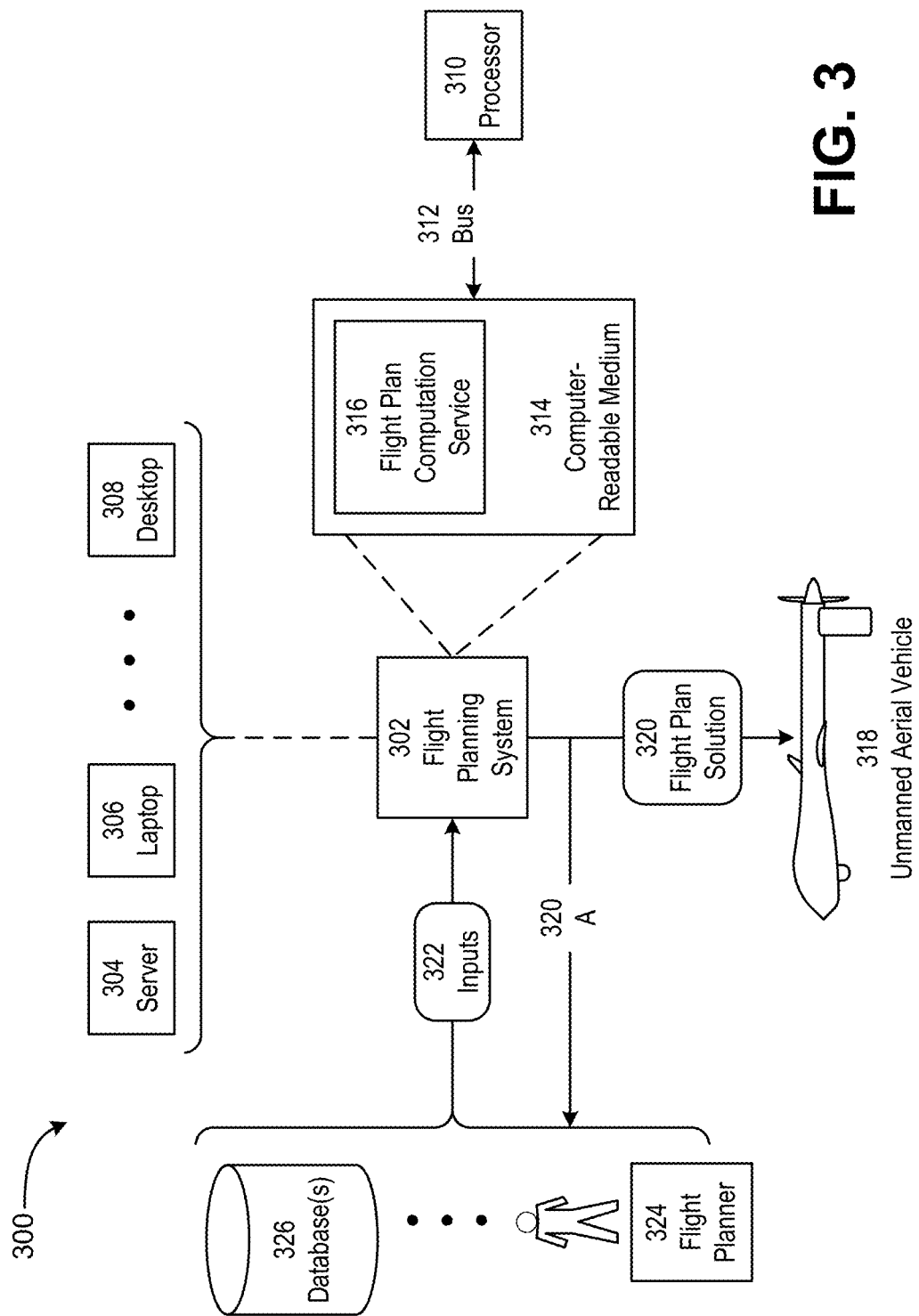
FIG. 3 depicts a block diagram illustrating systems or operating environments for controlling unmanned aerial vehicles (UAVs).

FIG. 3 illustrates systems or operating environments, denoted generally at 300, that provide flight plans for UAVs while routing around obstacles having spatial and temporal dimensions. These systems 300 may include one or more flight planning systems 302. FIG. 3 illustrates several examples of platforms that may host the flight planning system 302. These examples may include one or more server-based systems 304, one or more portable computing systems 306 (whether characterized as a laptop, notebook, tablet, or other type of mobile computing system), and/or one or more desktop computing systems 308. As detailed elsewhere herein, the flight planning system 302 may be a ground-based system that performs pre-flight planning and route analysis for the UAVs, or may be a vehicle-based system that is housed within the UAVs themselves.

Implementations of this description may include other types of platforms as well, with FIG. 3 providing non-limiting examples. For example, the description herein contemplates other platforms for implementing the flight planning systems, including but not limited to wireless personal digital assistants, smartphones, or the like. The graphical elements used in FIG. 3 to depict various components are chosen only to facilitate illustration, and not to limit possible implementations of the description herein.

Turning to the flight planning system 302 in more detail, it may include one or more processors 310, which may have a particular type or architecture, chosen as appropriate for particular implementations. The processors 310 may couple to one or more bus systems 312 that are chosen for compatibility with the processors 310.

The flight planning systems 302 may include one or more instances of computer-readable storage media 314, which couple to the bus systems 312. The bus systems may enable the processors 310 to read code and/or data to/from the computer-readable storage media 314. The media 314 may represent storage elements implemented using any suitable technology, including but not limited to semiconductors, magnetic materials, optics, or the like. The media 314 may include memory components, whether classified as RAM, ROM, flash, or other types, and may also represent hard disk drives.

The storage media 314 may include one or more modules 316 of instructions that, when loaded into the processor 310 and executed, cause the server 302 to provide flight plan computation services for a variety of UAVs 318. These modules may implement the various algorithms and models described and illustrated herein.

The UAVs 318 may be of any convenient size and/or type as appropriate for different applications. In different scenarios, the UAVs may range from relatively small drones to relatively large transport aircraft. Accordingly, the graphical illustration of the UAV 318 as shown in FIG. 3 is representative only, and is not drawn to scale.

The flight plan services 316 may generate respective flight plan solutions 320 for the UAVs 318 based on inputs 322, with flight planning personnel 324 and/or one or more databases 326 providing inputs 322.

Assuming that the flight plan services 316 define one or more solutions 320, the flight planning system 302 may load the solutions into the UAVs 318, as represented by the arrow connecting blocks 302 and 318 in FIG. 3. In addition, the flight planning system 302 may also provide the solutions 320 to the flight planner 324 and/or the databases 326, as denoted by the arrow 320A.

One difficulty with controlling UAVs is that a controller of a UAV is located remotely from the UAV and may not have the same situational awareness that a pilot may have when located inside of an aircraft during flight. Among a number of issues, the controller of a UAV may not have the ability to appreciate terrain surrounding the UAV. If the controller of the UAV cannot see the geographic area surrounding the UAV, the controller may inadvertently command the UAV to enter a dangerous area and/or crash into terrain.

One way to address difficulties with terrain and terrain awareness is to provide greater real-time visibility of the unsafe elevations within a defined area around the location of the UAV. For example, a layer may be overlaid on the controller's display showing one or more areas indicative of an unsafe elevation. Such a layer may be referred to herein as "terrain awareness layer." In some examples, an unsafe elevation may be depicted using colored areas on the current display showing where the UAV, given the current altitude of the UAV, is within a predefined level above the terrain. For example, the display may provide a first overlay showing all areas where the UAV will be less than 100 feet above terrain at the UAV's current altitude. The display may also indicate a second overlay showing all areas where the UAV will be less than a second altitude above terrain at the UAV's current altitude (for example, 200 feet above terrain). With such an overlay, the operator of the UAV may quickly ascertain which areas are unsafe with respect to distance above terrain if the UAV maintains the current altitude. This may allow the operator to avoid flying the UAV into the highlighted areas, or change course if the current flight path indicates that the UAV will fly into a highlighted area.

In one example, the terrain awareness layer may be automatically rendered on the UAV controller's display if it is determined that, within some predetermined time period, the UAV will enter an "unsafe" area (i.e., an area where the UAV will be less than a predefined altitude above terrain at the UAV's current altitude). In various examples, the predefined altitude may be automatically set. In other examples, the predefined altitude may be manually set by the operator. In some examples, if it is determined that the UAV will enter an unsafe area, the terrain awareness layer may be configured so that the layer cannot be removed by the operator.

In some examples, the operator may request display of the terrain awareness layer, even if the UAV is not headed toward an unsafe area. In this way, the operator may maintain awareness of the potential unsafe areas even if an unsafe area is not part of the current flight path.

In another example, the terrain awareness layer may be displayed when the operator is engaging the controls to change the current altitude of the UAV. For example, the user controls may include a graphical "sliding" altitude control. When the operator engages the control and moves the control to different altitudes, the terrain awareness layer may automatically change based on the currently selected altitude. In this way the controller can instantly view the unsafe altitudes as the controller considers various UAV altitudes.

The terrain awareness layer may be depicted using various colors or textures to indicate the areas corresponding to different unsafe altitudes. For example, areas that will have 100 feet or less clearance above ground at the current UAV altitude may be indicated in red, and areas that will have 200 feet or less clearance above ground at the current UAV altitude may be indicated in yellow.

Figure 4:
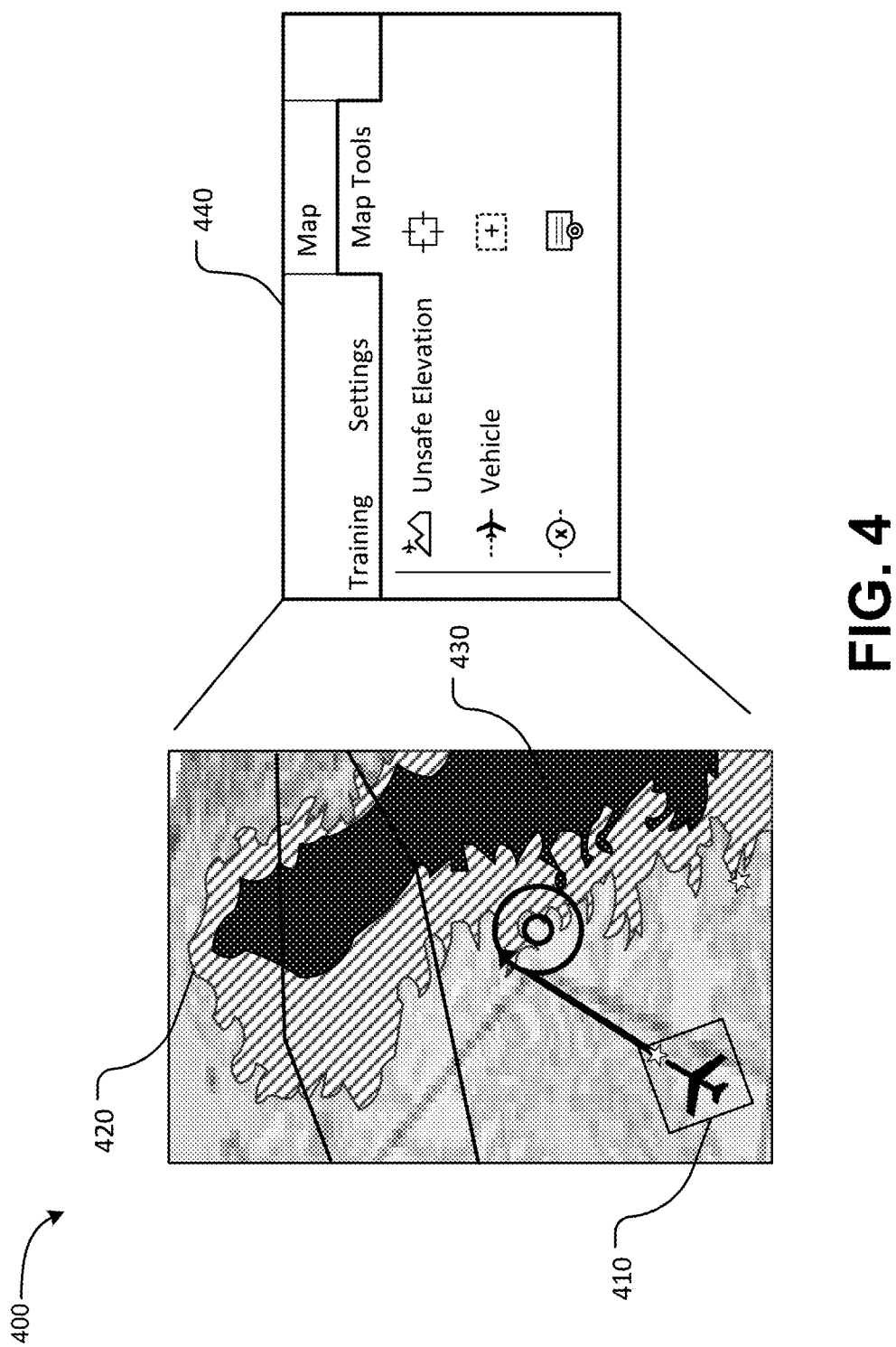
FIG. 4 depicts an example of a display that be provided to a UAV controller to view real-time information pertaining to the altitude of the UAV.

FIG. 4 depicts an example of a display 400 that can assist a UAV controller to view the terrain for the UAV flight and real-time information about the terrain with respect of the altitude of the UAV.

The display 400 depicted in FIG. 4 may also include real-time information about the flight. The display 400 includes an indication of the aircraft position 410 during the flight. In the particular example of FIG. 4, a first region 420 may indicate one or more areas where the distance between the current altitude of the aircraft 410 is less than a first predefined threshold. A second region 430 may indicate one or more areas where the distance between the current altitude of the aircraft 410 is less than a second predefined threshold. A set of user interface controls and indications 440 may be provided for requesting adding the first and second regions 420 and 430 to the current display 400.

Data to develop the terrain awareness layer can be stored locally on a system that is associated with the display 400, such as on a computing device that includes the display 400. The data to develop the terrain awareness layer can also be obtained from a remote system, such as the NASA Shuttle Radar Topography Mission (SRTM), the USGS Global Multi-resolution Terrain Elevation Data (GMTED), and the like. In the case where data is not available to generate the terrain awareness layer, the display 400 can display a warning that terrain data is not available. In this way, if the display 400 can indicate to the operator that the data is not available rather than a false indication that altitudes are safe.

The display 400 can be part of a user interface that allows a controller to interact with the display 400. Such a user interface may be used to adjust the display and/or the programming of the UAV. For example, movement of some controls associated with the display 400 can effect a change in the actual altitude of the UAV as it is flying.

In some examples, an RF link analysis layer may be provided that indicates a real-time analysis of RF links in the current UAV flight scenario. Such an RF link analysis layer may be useful to provide the operator of the UAV with information to make real-time mission planning and execution decisions, without the need to use rule-of-thumb estimates of link performance. UAVs typically operate with one or more ground antennae that may be directional or omni-directional and communicatively linked to downlink graphics data to the ground antennae as well as downlink/uplink telemetry and command data. It is therefore useful for the operator to avoid not only terrain hazards, but also loss of RF contact with the UAV.

In one example, a UAV operator may be provided real-time RF coverage of paired RF transmitters and receivers. The information provided in the RF link analysis layer may include information such as antenna pattern, gain, type, and power capabilities. The RF link analysis layer may provide the operator the ability to visually determine how strong an RF signal is for a particular area given a UAV's position.

In one example, RF link analysis layer may include information determined by comparing the predicted signal strength of RF links of a given area to the signal strength corresponding to lost communication and determining if that area will result in lost communication. In some examples, the user may request an RF link analysis layer in areas outside of the planned flight path (or without the UAV) so that the operator can determine the effects of changing the current flight path with regard to RF link strength and propagation patterns.

In one example, colored areas may be indicated on the user display overlaid on a current flight map indicating RF link analysis data. In some examples, the data may include signal strength and/or error rate. The data can be updated at a predetermined update rate. The data can also be updated based on the flight path of the UAV. For example, the UAV may sufficiently change position where the RF link analysis is changed and the RF link analysis layer may be redrawn.

Figure 5:
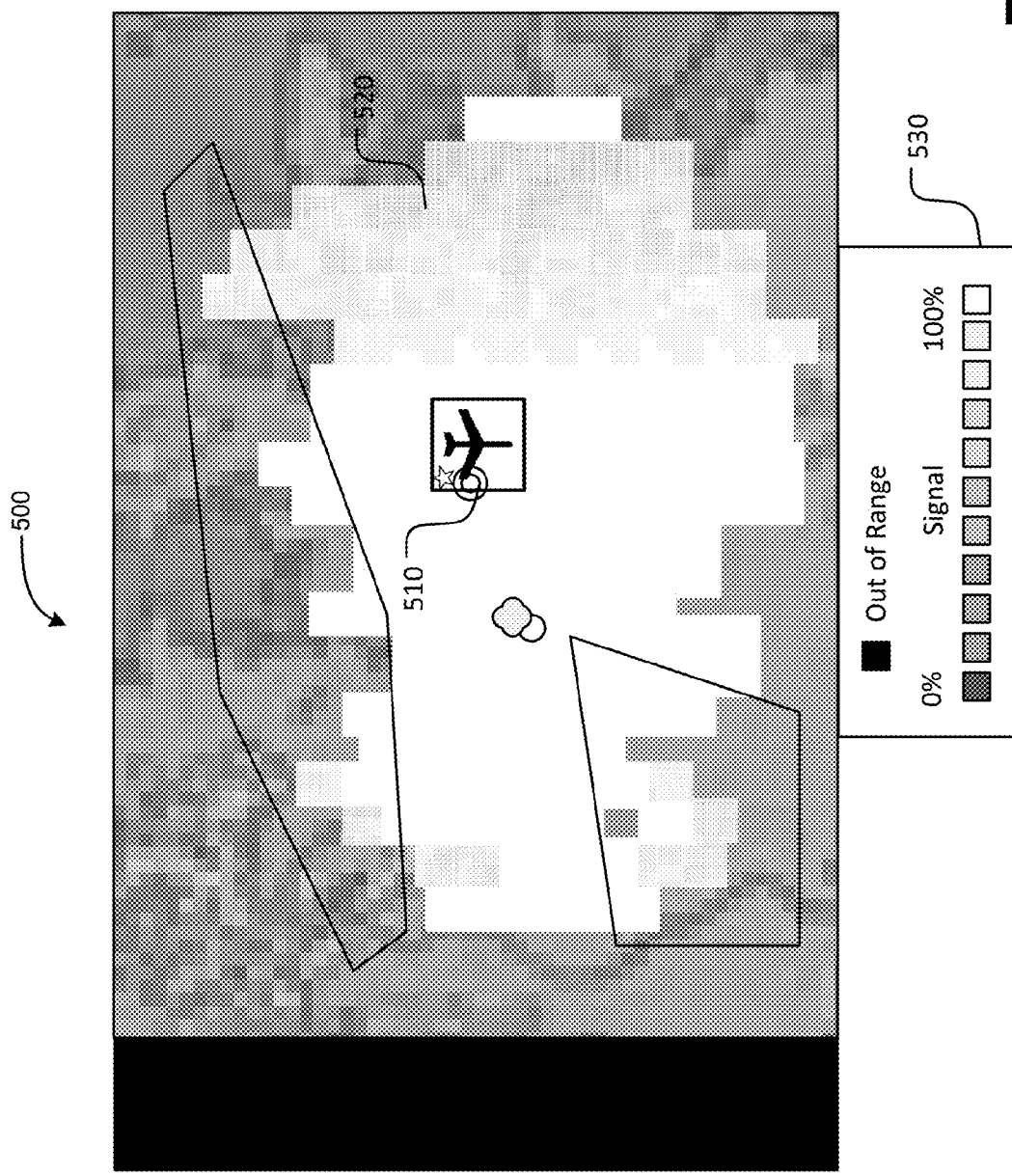
FIG. 5 depicts an example of a display that be provided to a UAV controller to view real-time information pertaining to the RF link status.

FIG. 5 depicts an example of a display 500 that can provide RF link analysis information in real time to a UAV controller.

The display 500 depicted in FIG. 5 may also include real-time information about the flight. The display 500 includes an indication of the aircraft position 510 during the flight. In the particular example of FIG. 5, fixed size portions 520 of the display may be color coded to indicate a relative estimated strength of the signal within the fixed size portion 520. In one example, the fixed size portion 520 may be a tile representing a predetermined area represented on the map. A set of user indications 530 may be provided for identifying the signal strengths depicted in the current display 500.

Figure 6:
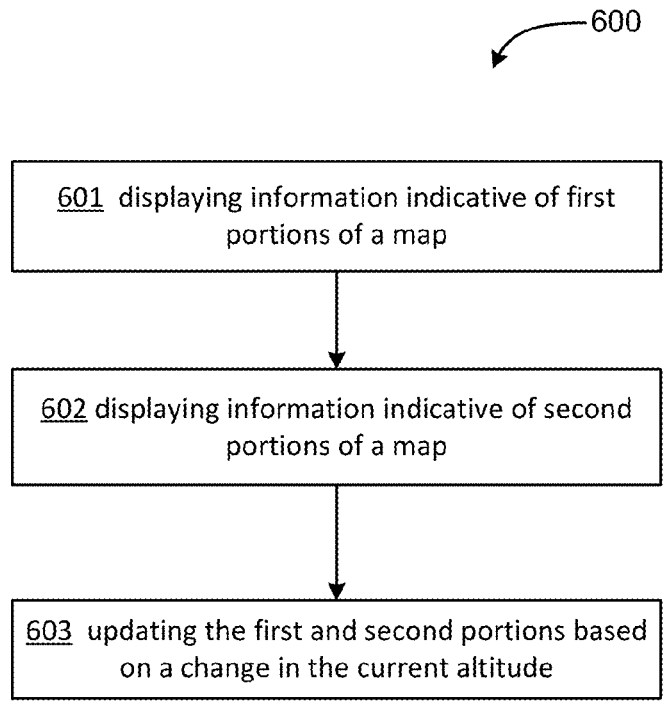
FIG. 6 depicts an example of a method of displaying a profile of terrain.

FIG. 6 depicts an example of a method 600 of displaying information pertaining to an air vehicle. At block 601, information is displayed that is indicative of first portions of a map where a distance between a current altitude of the air vehicle and terrain in the map are within a first threshold. At block 602, information is displayed indicative of second portions of a map where a distance between the current altitude of the air vehicle and terrain in the map are within a second threshold. At block 603, the first and second portions are updated based on a change in the current altitude of the air vehicle.

Figure 7:
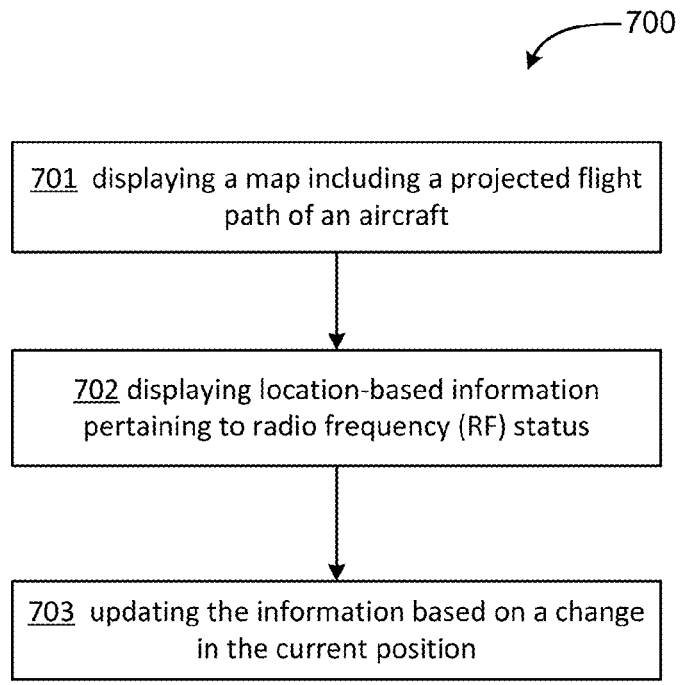
FIG. 7 depicts an example of a method of displaying RF link information.

FIG. 7 depicts an example of a method 700 of displaying information pertaining to an air vehicle. At block 701, a map including a projected flight path of an aircraft is displayed. At block 702, location-based information pertaining to radio frequency (RF) status between the aircraft and at least one ground radio is displayed on the map. At block 703, the location-based information pertaining to RF status is updated based on a change in the current position of the air vehicle.

Figure 8:
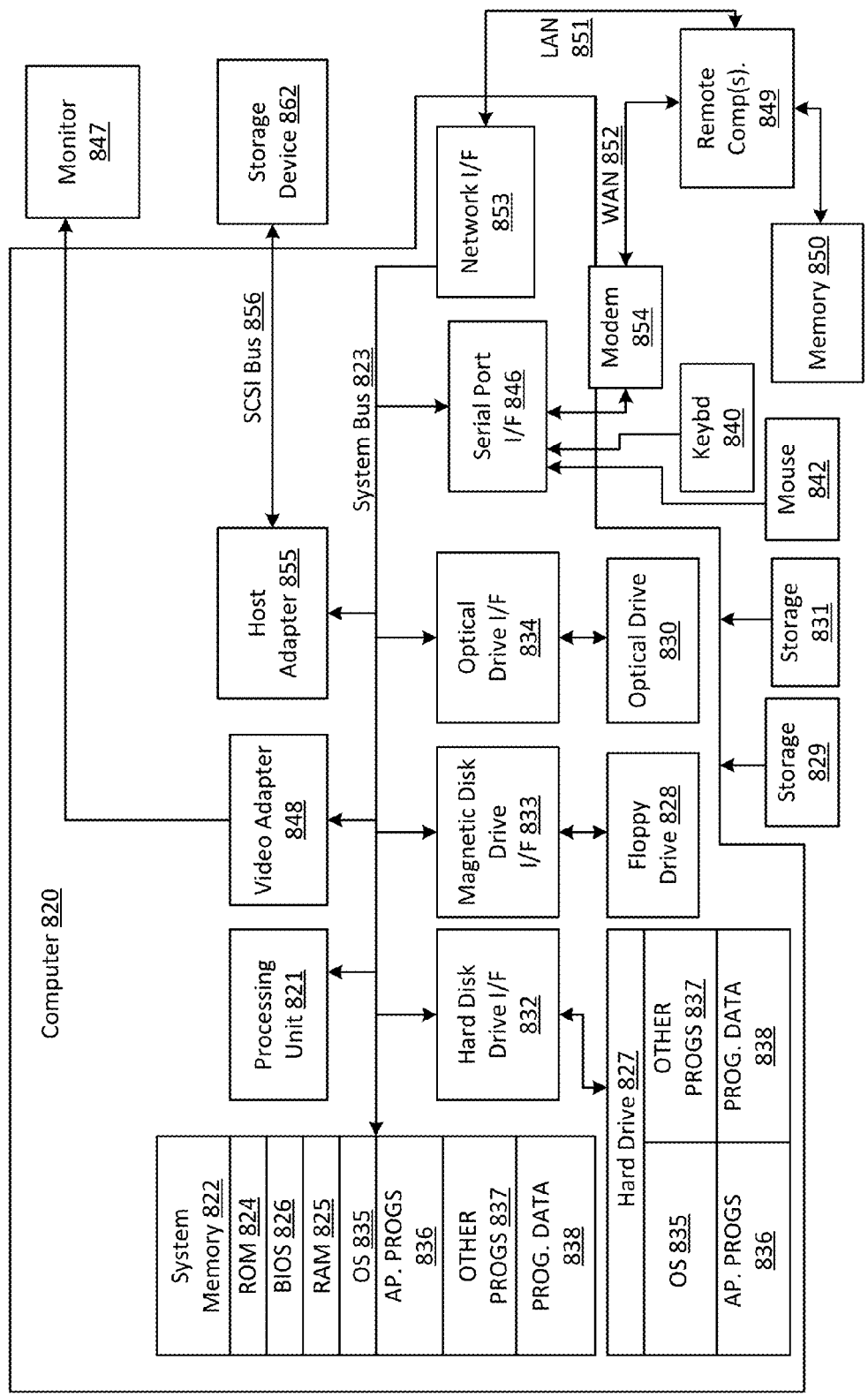
FIG. 8 depicts an illustration of an example computing environment in which operations according to the disclosed subject matter may be performed.

FIG. 8 and the following discussion are intended to provide a brief general description of a suitable computing environment in which the methods and systems disclosed herein and/or portions thereof may be implemented. For example, the functions of server 304, laptop 306, desktop 308, flight planning system 302, and database 326 may be performed by one or more devices that include some or all of the aspects described in regard to FIG. 8. Some or all of the devices described in FIG. 8 that may be used to perform functions of the claimed examples may be configured in other devices and systems such as those described herein. Alternatively, some or all of the devices described in FIG. 8 may be included in any device, combination of devices, or any system that performs any aspect of a disclosed example.

Although not required, the methods and systems disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 8 is a block diagram representing a general purpose computer system in which aspects of the methods and systems disclosed herein and/or portions thereof may be incorporated. As shown, the example general purpose computing system includes computer 820 or the like, including processing unit 821, system memory 822, and system bus 823 that couples various system components including the system memory to processing unit 821. System bus 823 may be any of several types of bus structures including a memory bus or memory controller, a peripheral bus, and a local bus using any of a variety of bus architectures. The system memory may include read-only memory (ROM) 824 and random access memory (RAM) 825. Basic input/output system 826 (BIOS), which may contain the basic routines that help to transfer information between elements within computer 820, such as during start-up, may be stored in ROM 824.

Computer 820 may further include hard disk drive 827 for reading from and writing to a hard disk (not shown), magnetic disk drive 828 for reading from or writing to removable magnetic disk 829, and/or optical disk drive 830 for reading from or writing to removable optical disk 831 such as a CD-ROM or other optical media. Hard disk drive 827, magnetic disk drive 828, and optical disk drive 830 may be connected to system bus 823 by hard disk drive interface 832, magnetic disk drive interface 833, and optical drive interface 834, respectively. The drives and their associated computer-readable media provide non-volatile storage of computer-readable instructions, data structures, program modules and other data for computer 820.

Although the example environment described herein employs a hard disk, removable magnetic disk 829, and removable optical disk 831, it should be appreciated that other types of computer-readable media that can store data that is accessible by a computer may also be used in the example operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 827, magnetic disk 829, optical disk 831, ROM 824, and/or RAM 825, including an operating system 835, one or more application programs 836, other program modules 837 and program data 838. A user may enter commands and information into the computer 820 through input devices such as a keyboard 840 and pointing device 842. Other input devices (not shown) may include a microphone, joystick, game pad, satellite disk, scanner, or the like. These and other input devices are often connected to the processing unit 821 through a serial port interface 846 that is coupled to the system bus, but may be connected by other interfaces, such as a parallel port, game port, or universal serial bus (USB). A monitor 847 or other type of display device may also be connected to the system bus 823 via an interface, such as a video adapter 448. In addition to the monitor 847, a computer may include other peripheral output devices (not shown), such as speakers and printers. The example system of FIG. 8 may also include host adapter 855, Small Computer System Interface (SCSI) bus 856, and external storage device 862 that may be connected to the SCSI bus 856.

The computer 820 may operate in a networked environment using logical and/or physical connections to one or more remote computers or devices, such as remote computer 849, that may represent any of server 304, laptop 306, desktop 308, flight planning system 302, and database 326. Each of server 304, laptop 306, desktop 308, flight planning system 302, and database 326 may be any device as described herein capable of performing the determination and display of zero fuel time data and return to base time data. Remote computer 849 may be a personal computer, a server, a router, a network PC, a peer device or other common network node, and may include many or all of the elements described above relative to the computer 820, although only a memory storage device 850 has been illustrated in FIG. 8. The logical connections depicted in FIG. 8 may include local area network (LAN) 851 and wide area network (WAN) 852. Such networking environments are commonplace in police and military facilities, offices, enterprise-wide computer networks, intranets, and the Internet.

When used in a LAN networking environment, computer 820 may be connected to LAN 851 through network interface or adapter 853. When used in a WAN networking environment, computer 820 may include modem 854 or other means for establishing communications over wide area network 852, such as the Internet. Modem 854, which may be internal or external, may be connected to system bus 823 via serial port interface 846. In a networked environment, program modules depicted relative to computer 820, or portions thereof, may be stored in a remote memory storage device. It will be appreciated that the network connections shown are example and other means of establishing a communications link between computers may be used.

Computer 820 may include a variety of computer-readable storage media. Computer-readable storage media can be any available tangible, non-transitory, or non-propagating media that can be accessed by computer 820 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium that can be used to store the desired information and that can be accessed by computer 820. Combinations of any of the above should also be included within the scope of computer-readable media that may be used to store source code for implementing the methods and systems described herein. Any combination of the features or elements disclosed herein may be used in one or more examples.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed:

1. A method of displaying information pertaining to an air vehicle, the method comprising:
    displaying information indicative of first portions of a map where a distance between a current altitude of the air vehicle and terrain in the map are within a first threshold;
    displaying information indicative of second portions of a map where a distance between the current altitude of the air vehicle and terrain in the map are within a second threshold; and
    updating the first and second portions based on a change in the current altitude of the air vehicle; wherein at least one of the first or second portions are automatically displayed in response to an indication that an operator is engaging controls to change the current altitude of the air vehicle.

2. The method of claim 1, wherein the first and second portions are indicated using different colors.

3. The method of claim 1, wherein the change in the current altitude is indicated by a user input indicative of a commanded altitude of the air vehicle.

4. The method of claim 1, wherein at least one of the first or second portions are automatically displayed if it is determined that the air vehicle will enter an area where the current altitude of the air vehicle will be within the first threshold or second threshold.

5. The method of claim 4, wherein the at least one of the first or second portions are automatically displayed when it is further determined that the air vehicle will enter the area within a predetermined time period.

6. The method of claim 4, wherein an operator is prohibited from removing the at least one of the first or second portions automatically displayed while the air vehicle is within the first threshold or second threshold.

7. A system configured to display information pertaining to an air vehicle, the system communicatively coupled to a display, the system comprising:
    at least one memory having stored therein computer instructions that, upon execution by one or more processors of the system, at least cause the system to:
        display information indicative of first portions of a map where a distance between a current altitude of the air vehicle and terrain in the map are within a first threshold;
        display information indicative of second portions of a map where a distance between the current altitude of the air vehicle and terrain in the map are within a second threshold; and
        update the first and second portions based on a change in the current altitude of the air vehicle, wherein at least one of the first or second portions are automatically displayed in response to an indication that an operator is engaging controls to change the current altitude of the air vehicle.

8. The system of claim 7, wherein the first and second portions are indicated using different colors.

9. The system of claim 7, wherein the change in the current altitude is indicated by a user input indicative of a commanded altitude of the air vehicle.

10. The system of claim 7, wherein at least one of the first or second portions are automatically displayed if it is determined that the air vehicle will enter an area where the current altitude of the air vehicle will be within the first threshold or second threshold.

11. The system of claim 10, wherein the at least one of the first or second portions are automatically displayed when it is further determined that the air vehicle will enter the area within a predetermined time period.

12. The system of claim 10, wherein an operator is prohibited from removing the at least one of the first or second portions automatically displayed while the air vehicle is within the first threshold or second threshold.

13. A non-transitory computer-readable storage medium having stored thereon computer-readable instructions, the computer-readable instructions comprising instructions that upon execution on one or more computing devices, at least cause the one or more computing devices to:
    display information indicative of first portions of a map where a distance between a current altitude of an air vehicle and terrain in the map are within a first threshold;
    display information indicative of second portions of a map where a distance between the current altitude of air vehicle and terrain in the map are within a second threshold; and
    update the first and second portions based on a change in the current altitude of the air vehicle, wherein at least one of the first or second portions are automatically displayed in response to an indication that an operator is engaging controls to change the current altitude of the air vehicle.

14. The computer-readable storage medium of claim 13, wherein the change in the current altitude is indicated by a user input indicative of a commanded altitude of the air vehicle.

15. The computer-readable storage medium of claim 13, wherein at least one of the first or second portions are automatically displayed if it is determined that the air vehicle will enter an area where the current altitude of the air vehicle will be within the first threshold or second threshold.

16. The computer-readable storage medium of claim 15, wherein the at least one of the first or second portions are automatically displayed when it is further determined that the air vehicle will enter the area within a predetermined time period.

17. A flight information display for an air vehicle, the display comprising:

a first region of terrain having a first elevation, wherein the first region comprises a first indicator representing the height of the first elevation of the first region of terrain;

a second region of terrain having a second elevation, wherein the second region comprises a second indicator representing the height of the second elevation of the second region of terrain;

an air vehicle icon representing the air vehicle, wherein the air vehicle icon is configured to move within the display; and one or more warning notifications based on a height difference between the air vehicle and the height of the first elevation or the height of the second elevation, wherein at least one of the first or second regions are automatically displayed in response to an indication that an operator is engaging controls to change the current altitude of the air vehicle.

* * * * *